United States Patent [19]

Takacs et al.

[11] 4,214,611
[45] Jul. 29, 1980

[54] TIE-DOWN FOR ACCUMULATOR BAGS

[75] Inventors: Robert J. Takacs, Chardon; Winfield S. Brunkhurst, Shaker Heights; Edward T. Le Breton, Mentor, all of Ohio

[73] Assignee: Structural Fibers, Inc., Chardon, Ohio

[21] Appl. No.: 21,588

[22] Filed: Mar. 19, 1979

[51] Int. Cl.² ............................................. F16L 55/00
[52] U.S. Cl. ................................................... 138/30
[58] Field of Search ................... 138/26, 30; 220/85 B

[56] References Cited

U.S. PATENT DOCUMENTS

| Re. 25,241 | 9/1962 | Randolph | 156/218 X |
|---|---|---|---|
| 2,401,792 | 6/1946 | Overbeke | 138/30 |
| 2,630,834 | 3/1953 | Weber et al. | 138/30 |
| 2,932,320 | 4/1960 | Mercier | 220/85 B |
| 3,138,176 | 6/1964 | Mercier | 138/30 |
| 3,580,290 | 5/1971 | Sugimura et al. | 138/30 X |
| 3,654,002 | 4/1972 | Wiltshire et al. | 156/172 X |
| 4,099,545 | 7/1978 | Zahid | 138/30 |
| 4,108,209 | 8/1978 | Zahid | 138/30 |

FOREIGN PATENT DOCUMENTS 877517  4/1953  Fed. Rep. of Germany ............ 138/30

Primary Examiner—Richard E. Aegerter
Assistant Examiner—James E. Bryant, III
Attorney, Agent, or Firm—Pearne, Gordon, Sessions

[57] ABSTRACT

A pressurizing tank for a liquid dispensing system is disclosed. The system includes a pressure withstanding vessel having openings at both ends with a strainer fitting fixed in one of the openings. A flexible, inflatable, gas-tight bag is provided in the vessel and has an inflating valve at one end thereof which is fixed in the other opening in the vessel. The other end of the bag is fixed to the strainer fitting.

4 Claims, 3 Drawing Figures

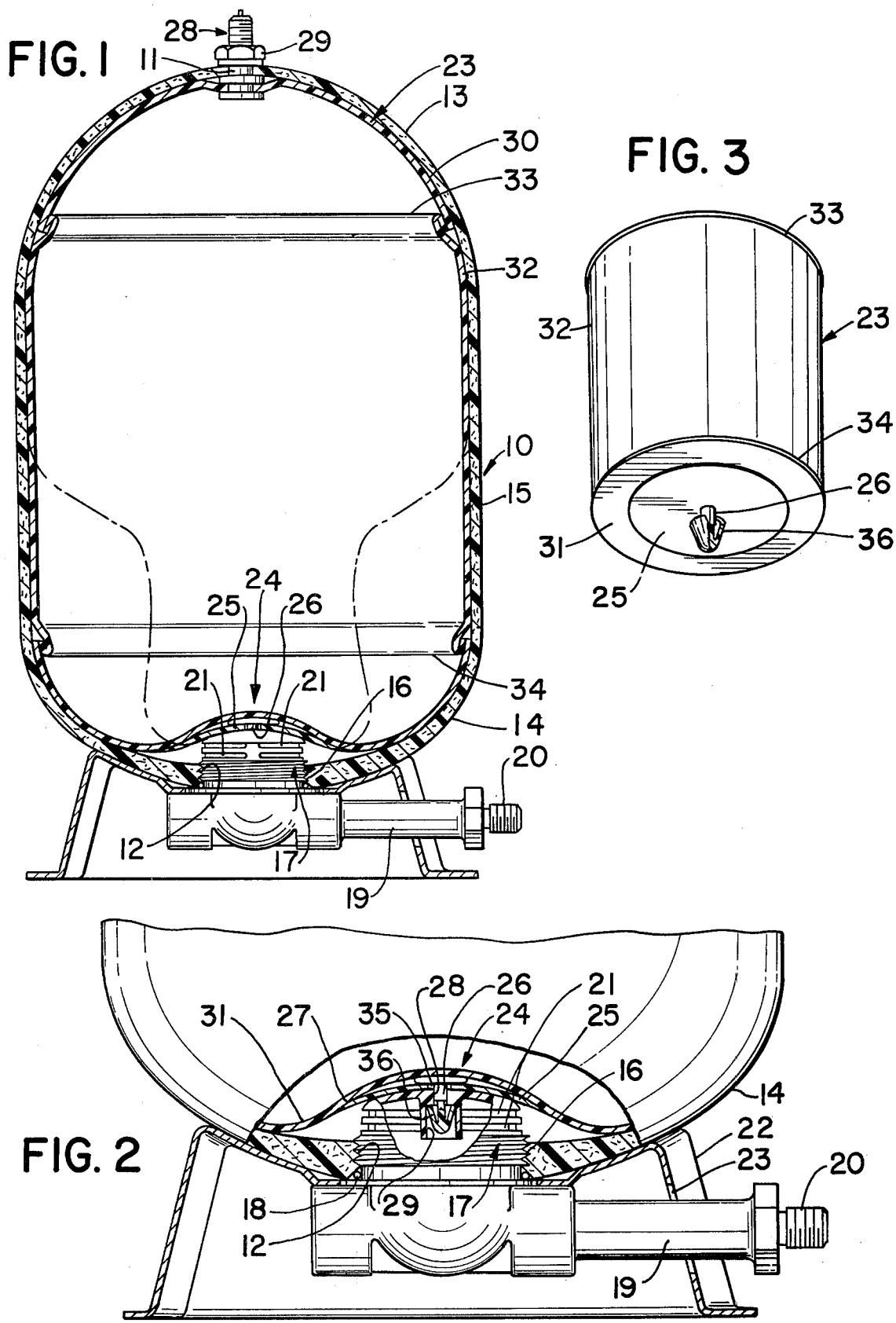

TIE-DOWN FOR ACCUMULATOR BAGS

BACKGROUND OF THE INVENTION

This invention relates to an accumulator or pressure control device especially adapted for liquid dispensing systems, and particularly for water systems dependent upon well water, a pump and, because of intermittent use, an intermittent source of pressurization for the system. A simple prior art system for accommodating the pressurization of a well water system, for example in a dwelling, comprises a pipe extending into the underground water supply, a pump and a reservoir tank. Frequently, the tank is a metal container having no valve and in which air is merely trapped. In some installations, a valve, such as a regular tire valve, may be positioned at or near the top of the container and an outlet near the bottom. No diaphragm is provided. A charge of air is introduced into the tank, usually occupying about one-half the volume of the tank and to a pressure sufficient to force water into the plumbing system connected thereto. A pressure switch senses the pressure within the tank or in the water line, as the case may be, and operates between limits, for example between 20 and 40 psi. If the pressure falls below 20 psi, the pump is activated and continues to operate until the pressure in the system is built up to 40 psi, when the pump is turned off by the pressure switch.

Typical prior art accumulators include a pressure vessel having an inflatable bag therein, with an inflating valve extending through one end of the tank. An inlet and outlet aperture is provided in the other end of the tank, and that aperture is in fluid communication with the water system. As water is pumped into the tank, the bag is forced upwardly by the incoming water. This upward movement is characterized by a sharp annular crease adjacent the inner sidewall of the vessel, which progresses upwardly as the water rises and downwardly as the water is forced from the tank by the pressure in the bag. Thus, there is a substantially constant flexing of major portions of the sidewall of the bag.

Furthermore, in many prior art accumulator tanks the inlet-outlet strainer is domed and has drain openings spaced a substantial distance from the bottom of the tank. Grit tends to accumulate between the drain openings and the bottom of the tank which abrades the bag as the bag contacts these particles. The abrading action plus the annular flexure seriously limits bag life, necessitating frequent replacement of the bag.

SUMMARY OF THE INVENTION

The present invention is an improvement of such prior art devices. A unitary nonmetallic tank structure is provided which avoids premature bag failure problems by providing a means to fasten the bag to the bottom of the tank. By fastening the bag to the bottom of the tank, the bag is forced radially inwardly by incoming water and the sidewall of the bag is not flexed in the manner previously discussed with reference to the prior art. The bag is held to the strainer fitting by a plastic diaphragm which is heat-sealed at its periphery to the bag and which has a pronged pin projecting therethrough which is received within an opening in the strainer. The strainer itself has a plurality of openings, at least some of which are closely adjacent the bottom of the pressure vessel so that grit will not accumulate in the tank and abrade the bag.

BRIEF DESCRIPTION OF THE DRAWING

FIG. 1 is a cross sectional, elevational view of an accumulator tank according to this invention;

FIG. 2 is a fragmentary view, partly in section, of the drain fitting, showing the attachment between the fitting and the accumulator bag; and FIG. 3 is a perspective view of the bag.

DETAILED DESCRIPTION OF THE INVENTION

Referring now to the drawing, there is illustrated an accumulator vessel or tank 10 having a top opening 11 and a bottom opening 12. The pressure vessel is formed of domed end portions 13 and 14, each preferably having the geometric configuration of an oblate ellipsoid, and an intermediate, cylindrical portion 15. While the pressure vessel 10 may be built up from separate portions 13, 14, and 15 cemented together to form a unitary tank, it is more desirable to produce unitary, seamless tanks from glass fiber-reinforced resinous compositions, and especially in accordance with the process described in U.S. Pat. No. Re. 25,241 to Randolph, dated Sept. 11, 1962. Preforms suitable for use for the bag molding of fiber-reinforced articles, such as tanks, are disclosed in U.S. Pat. No. 3,654,002, dated Apr. 4, 1972 to Wiltshire et al.

The end portion 14 is molded with an opening therein and is tapped to provide threads 16 which receive a threaded cup-shaped drain fitting 17. The opening is sealed by an O-ring 18. A pipe fitting 19 communicates with the drain fitting 17 and has a threaded end 20 which is adapted to be connected to the home water system. The fitting 17 is provided with a plurality of openings 21, some of which are closely adjacent the opening 12. The vessel 10 is conveniently supported upon a foot structure 22 suitably secured to the vessel 10 by means of an adhesive. The pipe fitting 19 extends through an aperture 23 in the foot structure 22.

The interior of the pressure vessel 10 is lined with a flexible, inflatable gas-tight bag 23, and the bag 23 is attached at its bottom to the drain fitting 17 by an attaching arrangement 24. The attaching arrangement 24 includes a disk-shaped membrane 25 which may be of the same material at that of the bag 23, and a locking pin 26. The disk-shaped membrane 25 is heat-sealed to the bottom of the bag at 27 and the pin 26 is received within a bore 28 in the fitting 17. The bore 28 is provided with a counterbore 29 so that hook-shaped projections 30 on the pin 26 may snap into place to securely hold the membrane 25, and therefore the bag 23, in place. When water is admitted to the tank, the bag will be forced radially inwardly, as shown by the phantom lines in FIG. 1, and will not be folded upon itself as was the case with prior art arrangements. The top of the bag is provided with a conventional tire valve 28 which extends through the opening 11 and is secured by a nut 29. As is set forth in U.S. application Ser. No. 375,488, filed July 2, 1973 (now abandoned), the flexible, inflatable, gas-type bag 23 is conveniently formed of two circular end pieces 30 and 31 sealed at their respective circumferential edges to the edges of a tubular body 32, which may be a seamless tube or, less desirably, a tubular member having a longitudinal seam therein. The seams are desirably dielectrically sealed or heat-sealed seams, such as seams 33 and 34 on the top and bottom marginal edges of the tubular member 32. Conveniently, the material from which the gas-tight bag is formed is polyvinyl chloride.

The accumulator is assembled by sealing the disk-shaped membrane 25 onto the bottom of the bag in a centered position. The pin 26 may then be inserted through one of a number of apertures 35 in the membrane 25, and then the pin may be inserted downwardly through a central aperture in the membrane to achieve its illustrated position. The pin is then pressed into the bore 28 so that its projections 36 are received within the counterbore 29. The bag is then inserted into the pressure vessel 10 through the opening 12 and the strainer 17 may be threaded in place. Prior to insertion of the bag, a rod (not shown) is threaded into the valve 28 to extend through the opening 11. After the strainer 17 is in place, the rod is withdrawn through the opening 11 to draw the valve 28 into its illustrated position. The nut 29 is then threaded onto the valve stem and the accumulator tank is ready for operation.

Although the preferred embodiment of this invention has been shown and described, it should be understood that various modifications and rearrangements of the parts may be resorted to without departing from the scope of the invention as disclosed and claimed herein.

What is claimed is:

1. A pressurizing tank for a liquid dispensing system, comprising a pressure withstanding vessel, means defining a first opening in one end of the vessel, a cup-shaped strainer fitting removably mounted in said first opening and having a plurality of openings therethrough; said cup-shaped strainer fitting having an aperture therein means defining a second opening at the other end of the vessel, a flexible, inflatable, gas-tight bag within said vessel dimensioned to fit through said first opening when deflated and to cover the inner surface of said vessel when fully inflated, a bag inflating valve fixed to one end of the bag and extending through said second opening, and attaching means for fixing the other end of the bag to said strainer fitting, said attaching means comprising a disc-shaped pad having an aperture sealed at its periphery to the bottom of the bag, a pin having an enlarged head at one end and a prong at the other end, said pin extending through an aperture in said pad and having its head captured between said pad and the bottom of the bag, said prong extending through an aperture in said strainer fitting.

2. A pressurizing tank according to claim 1, wherein at least some of said plurality of openings in said strainer are located closely adjacent the first opening in the pressure vessel.

3. A pressurizing tank according to claim 1, wherein the pressure withstanding vessel is formed from a glass fiber reinforced resinous composition.

4. A pressurizing tank in accordance with claim 1, wherein the flexible, inflatable, gas-tight bag is formed from polyvinyl chloride.

* * * * *